US010230970B2

(12) United States Patent
Rodriguez et al.

(10) Patent No.: US 10,230,970 B2
(45) Date of Patent: Mar. 12, 2019

(54) DECODED PICTURE BUFFER SIZE MANAGEMENT

(71) Applicant: Cisco Technology, Inc., San Jose, CA (US)

(72) Inventors: Arturo A. Rodriguez, Norcross, GA (US); Anil Kumar Katti, Atlanta, GA (US); Hsiang-Yeh Hwang, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 594 days.

(21) Appl. No.: 13/939,174

(22) Filed: Jul. 10, 2013

(65) Prior Publication Data

US 2014/0016710 A1    Jan. 16, 2014

Related U.S. Application Data

(60) Provisional application No. 61/670,078, filed on Jul. 10, 2012.

(51) Int. Cl.
*H04N 19/423* (2014.01)
*H04N 21/234* (2011.01)
(Continued)

(52) U.S. Cl.
CPC ......... *H04N 19/423* (2014.11); *H04N 21/234* (2013.01); *H04N 21/23424* (2013.01); *H04N 21/44004* (2013.01); *H04N 21/44016* (2013.01); *G06F 12/0851* (2013.01); *H04N 19/114* (2014.11); *H04N 19/142* (2014.11); *H04N 19/174* (2014.11); *H04N 19/177* (2014.11)

(58) Field of Classification Search
CPC .......... H04N 21/234; H04N 21/23424; H04N 21/44004; H04N 21/44016; H04N 19/142; H04N 19/174; H04N 19/177; H04N 19/114; H04N 19/423; G06F 12/0851
See application file for complete search history.

(56) References Cited

U.S. PATENT DOCUMENTS

| 2005/0025250 | A1 | 2/2005 | Linzer |
| 2008/0018793 | A1* | 1/2008 | Lee .......................... H04N 5/45 348/581 |
| 2010/0218232 | A1 | 8/2010 | Rodriguez et al. |

OTHER PUBLICATIONS

International Search Report and Written Opinion dated Nov. 27, 2013 in PCT/US2013/049992, 12 pages.
(Continued)

*Primary Examiner* — Joseph G Ustaris
*Assistant Examiner* — William Adrovel
(74) *Attorney, Agent, or Firm* — Merchant & Gould P.C.

(57) ABSTRACT

In one embodiment a method of video processing is disclosed. The method may include receiving by a processing device a first portion of compressed pictures of a bitstream, the first portion of compressed pictures corresponding to a first picture resolution format (PRF), the first portion of the compressed pictures comprising at least one picture compressed at a first encoding level, the first portion of the compressed pictures having an intended picture output as a sequence of pictures in the first PRF; determining a size of the largest picture of the first encoding level; determining a first number of picture buffers corresponding to the largest picture; allocating a linear memory based on the first number of picture buffers and size of the largest picture; determining a ratio of a picture size of the at least one picture of the first portion of the compressed picture and the largest picture size of the first encoding level; determining a second number of picture buffers based on the determined ratio; and mapping the second number of picture buffers in the first number of picture buffers.

20 Claims, 6 Drawing Sheets

(51) Int. Cl.
    *H04N 21/44*     (2011.01)
    *H04N 19/114*     (2014.01)
    *H04N 19/142*     (2014.01)
    *H04N 19/174*     (2014.01)
    *H04N 19/177*     (2014.01)
    *G06F 12/0846*     (2016.01)

(56) References Cited

OTHER PUBLICATIONS

Rodriguez et al., "Variable MaxDpbSize for smaller pictures based on sample rate and maximum number of yet-to-be output pictures", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL:http://wftp3.itu.int/av-arch/jctvc-site/, No. JCTVC-J0496, Jul. 11, 2012 (Jul. 11, 2012).
Narasimhan, S., "Splicing issues and some suggested changes", 23. JVT Meeting; 80. MPEG Meeting; Apr. 21, 2007-Apr. 24, 2007; San Josa CR, US; (Joint Video Team of ISO/IEC JTC1/SC29/WG11 and ITU-T SG.16), No. JVT-W134, May 2, 2007 (May 2, 2007), XP030007094, ISSN: 0000-0153 p. 2, paragraph 1.
European Communication dated Jan. 9, 2018 cited in Application No. 13 742 772.0, 6 pgs.
Chinese Second Office Action dated Nov. 16, 2017 cited in Application No. 201380036927.4, 8 pgs.
Chinese First Office Action dated Apr. 18, 2017 cited in Application No. 201380036927.4, 18 pgs.
Chinese Third Office Action dated Mar. 26, 2018 cited in Application No. 201380036927.4, 3 pgs.

\* cited by examiner

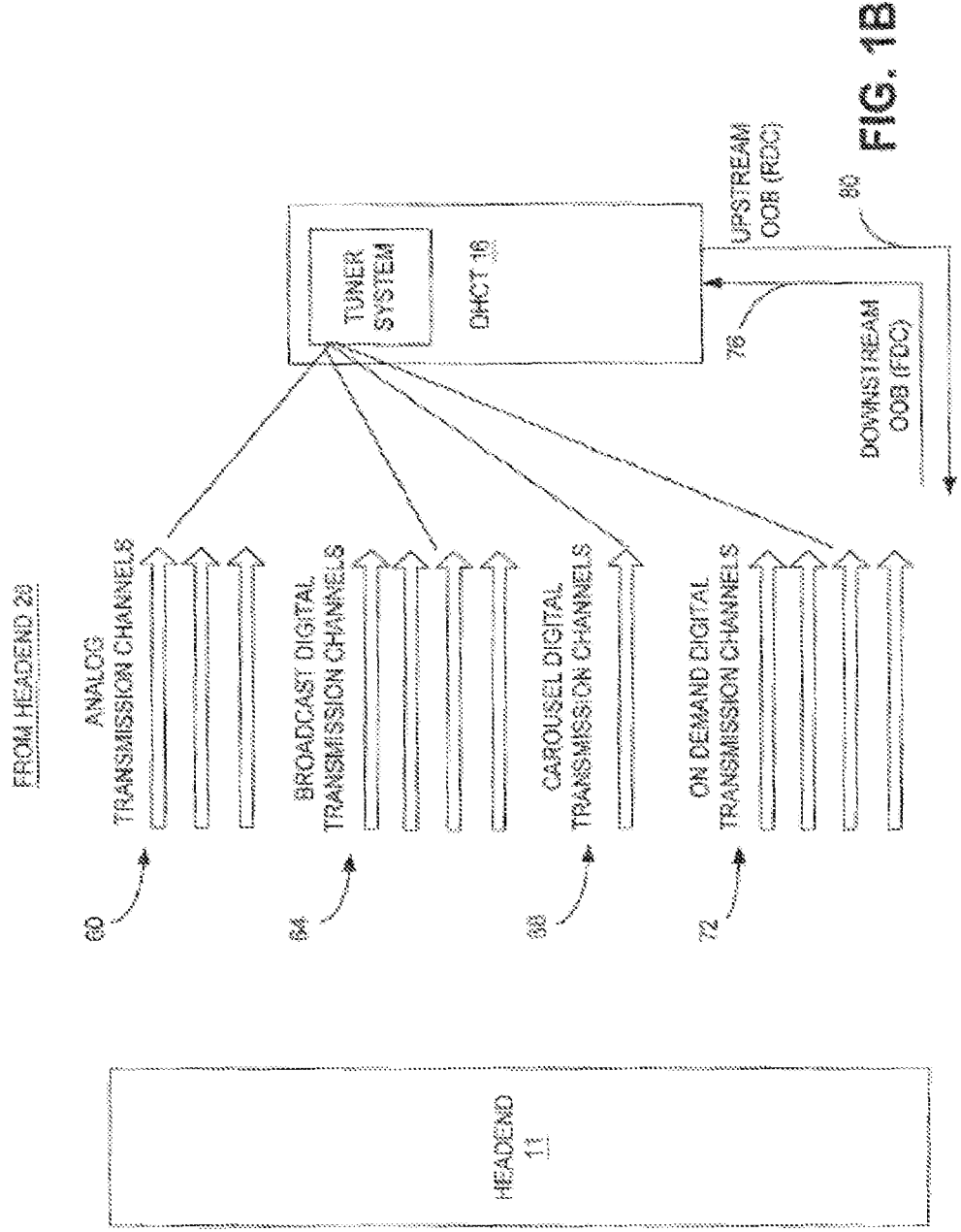

DECODED PICTURE BUFFER SIZE MANAGEMENT

TECHNICAL FIELD

This disclosure relates in general video processing.

BACKGROUND

In network systems such as subscriber television systems, a digital home communication terminal ("DHCT"), otherwise known as the set-top box, is capable of providing video services connected to the subscriber television system, and is typically located at the user's premises and connected to the subscriber television system, such as, for example, a cable or satellite network. The DHCT includes hardware and software necessary to provide digital video services to the end user with various levels of usability and/or functionality. One of the features of the DHCT includes the ability to receive and decompress a digital video signal in a compressed format, wherein such compression or coding may be in accordance with a video coding specification such as the Advanced Video Coding (AVC) standard, and the resulting coded video streams are referred to herein as bitstreams. New video coding specifications generally have a rich set of compression tools and can exploit temporal redundancies among pictures in more elaborate and comprehensive ways than prior video coding standards. Such advanced features also impose challenge in management of resources when the picture resolution of pictures to be decoded changes and prior decoded pictures are not yet output.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1B is a block diagram illustrating the transmission signals supported by the STS.

DETAILED DESCRIPTION

Overview

Figure 1A:
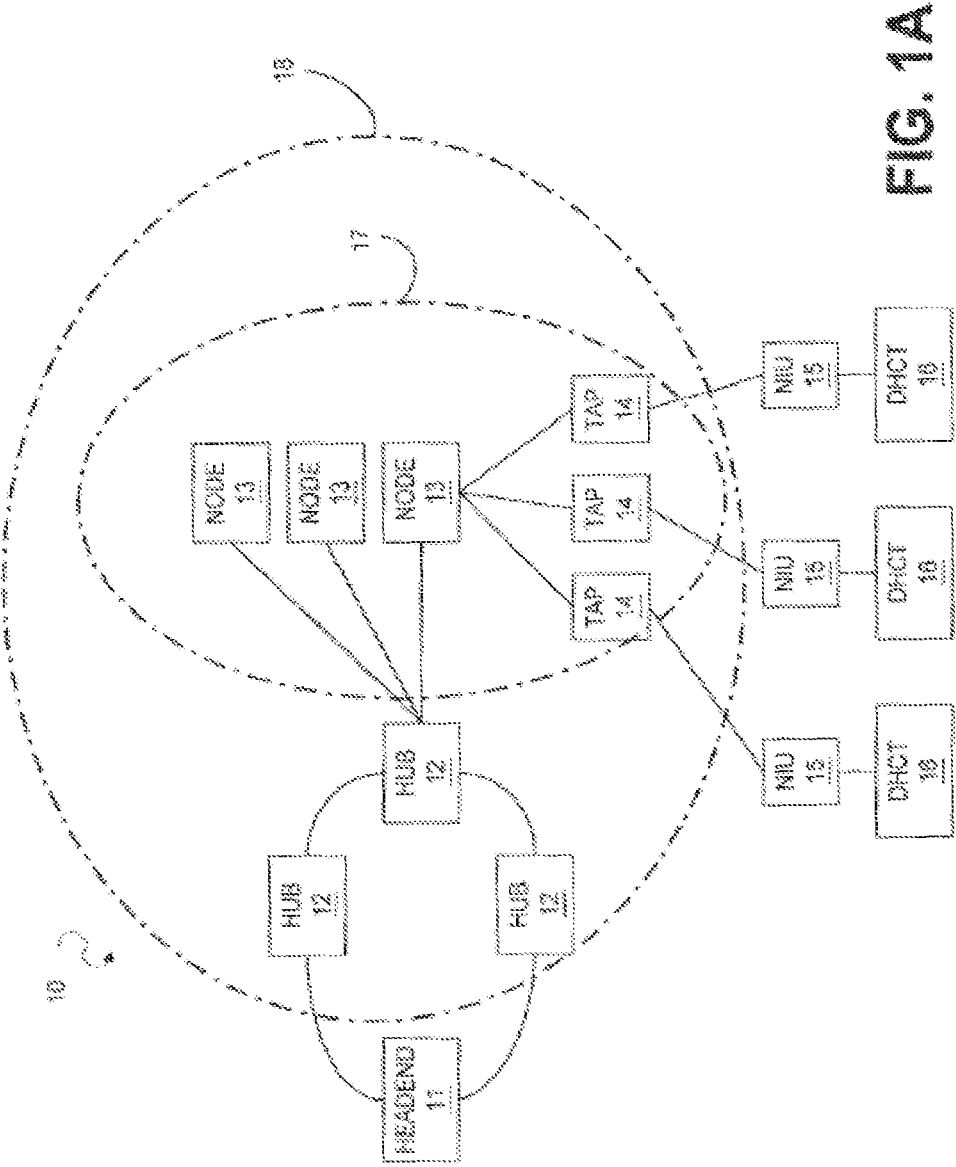
FIG. 1A is a diagram illustrating shows a block diagram view of a subscriber television system (STS).

In one method embodiment a method of processing a bitstream is disclosed. The method includes receiving at a processing device a bitstream comprising a first coded video sequence (CVS) having a first picture resolution; the processing device allocating an amount of memory corresponding to a maximum number of frame buffers of a decoded picture buffer (DPB), herein called MaxDpbSize, such that the value of MaxDpbSize equals a first number, and each of the "first number" (i.e., first number is a positive integer) frame buffers in the DPB corresponds to a maximum frame buffer size for storing a decoded picture having a maximum picture resolution; the processing device configured to size each frame buffer of the DPB in units corresponding to a maximum coding block size; receiving a first auxiliary information corresponding respectively to the first CVS, said first auxiliary information corresponding to the first picture resolution; responsive to receiving the first auxiliary information, determining by the processing device a first frame buffer size corresponding to the first picture resolution; and determining by the processing device a second number for the value of MaxDpbSize according to the magnitude of the first frame buffer size in relation to the magnitude of the maximum frame buffer size, where the second number is different than the first number.

Example Embodiments

Disclosed herein are various example embodiments of video processing (VP) systems and methods (collectively, referred to herein also as a VP system) that convey and process a bitstream and auxiliary information delivered in, corresponding to, or associated with, the bitstream.

The Advanced Video Coding (H.264/AVC) standard is known as ITU-T Recommendation H.264 and ISO/IEC international Standard 14496-10, also known as MPEG-4 Part 10 Advanced Video Coding (AVC). Similarly to earlier video coding standards, a video coding specification provides the syntax and semantics for the bitstream that enable the decoding process for error-free bitstreams.

The input to a video encoder is a sequence of pictures and the output of a video decoder is also a sequence of pictures. A picture may either be a frame or a field. A frame comprises a matrix of luma samples and corresponding chroma samples. A picture is partitioned into contiguous non-overlapping blocks of luma samples and their corresponding blocks of chroma samples for encoding purposes. Each of the contiguous non-overlapping blocks in their coded form may be called a Coding Tree Unit (CTU), or alternatively a coding block. A video coding specification may include plural coding block sizes, of which the maximum coding block size among the plural coding block sizes may be considered the worst-case coding block size. The worst-case coding block size may also be referred to as the largest coding unit (LCU).

A picture may be further partitioned to one or more slices, each including an integer number of coded blocks (i.e., CTUs) ordered consecutively in raster scan order. In one embodiment, each coded picture is coded as a single slice.

A video encoder outputs a bitstream of coded pictures corresponding to the input sequence of pictures. The bitstream of coded pictures is the input to a video decoder, which outputs a sequence of pictures corresponding to the decoded version of the coded pictures of the input bitstream.

In a video coding specification, such as AVC/H.264, each network abstraction layer (NAL) unit in the bitstream has a NAL unit header that includes a NAL unit type. Each coded picture in the bitstream corresponds to an access unit comprising one or more NAL units.

A NAL unit can identify with its NAL unit type a respectively corresponding type of data, such as a sequence parameter set (SPS), a picture parameter set (PPS), an SEI (Supplemental Enhancement Information), or a slice which consists of a slice_header followed by slice data (i.e. coded picture data). The SPS may contain video usability information (VUI). A coded picture includes the NAL units that are required for the decoding of the picture. One or more of the above mentioned parameter sets, such as the SPS, may contain auxiliary information referred in one or more of the embodiments herein.

The bistream produced by a video encoder consists of one or more coded video sequences (CVSes). Each coded video sequence (CVS) corresponds to a random access point (RAP) that enables entering the bitstream at that point. The CVS consists, in decoding order, of a first picture called a RAP picture, which corresponds to an intra coded picture, followed by other pictures up to but not including the first picture of the next CVS. Each CVS corresponds respectively to a set of parameters, such as an SPS and one or more PPSes, required to decode the coded pictures in the CVS. Certain parameters of the bitstream are only allowed to change at the start of a CVS. The picture resolution, which as an example, can be expressed by pic_width_in_luma_samples, pic_height_in_luma_samples, is only allowed to change at the start of a CVS.

In one embodiment the picture decode rate is controlled via a specified clock tick specified by the parameters corresponding to the respective CVS. In an alternate embodiment, the picture output rate is controlled via the clock tick specified by the parameters corresponding to the respective CVS The bitstream syntax of the video coding specification indicates whether or not a particular coded picture is a reference picture for inter prediction of any other picture. Consequently, a picture not used for prediction (a non-reference picture) is not marked as "used for reference" by the video decoder and when it is no longer needed for output, the video decoder can further mark it as "no longer needed for output" so that the corresponding frame buffer of the Decoded Picture Buffer (DPB) it occupies can be re-used by a subsequent decoded picture.

In accordance with the video coding specification, a video decoder marks decoded non-reference and reference pictures that reside in the DPB respectively as "not needed for reference" or "needed for reference." The video decoder further marks a decoded reference picture that resides in the DPB as "not needed for reference" after it is no longer needed for reference for the decoding of other coded pictures in the bitstream. Likewise, the video decoder marks a decoded picture as "not needed for output" when the picture has been output, or in accordance with one embodiment, when after the last output instance of the picture.

The markings are performed in order to free up the consumption or occupancy of frame buffers of the DPB.

A decoded picture may occupy a frame buffer of the DPB because it is used as a reference in inter-prediction by one or more subsequent coded pictures, or because its output time is later than its decode time In accordance with the HRD, the frame buffer of the DPB occupied by a first decoded picture becomes available (i.e., freed up) to store a subsequent decoded picture (i.e., a second decoded picture) upon the first decoded picture being marked as "not needed for reference" and "not needed for output."

The definition of the output of a picture in a video coding specification, such as ITU H.264 (a.k.a. as MPEG-4 AVC or ISO/IEC 14496 Part 10), typically refers to the time that picture is output from the DPB, and not necessarily the time that the picture is presented or displayed in a visual surface or emitting light device, such as display monitor or television.

Any two consecutive CVSes in a bitstream may correspond to two respective video sources with different picture resolutions, such as at a transition between a broadcast video program and a commercial. As in AVC/H.264, a video coding specification may include a no_output_of_prior_pics_flag that when set not equal to one, would allow a change to the respective values of pic_width_in_luma_samples and pic_height_in_luma_samples in the second of two consecutive CVSes In one method embodiment a processing device receives a bitstream comprising a first CVS having a first picture resolution. Upon receiving the bitstream, the processing device allocates an amount of memory corresponding to a maximum number of frame buffers of the DPB, herein called MaxDpbSize. The value of MaxDpbSize equals a first number, which can be referred to as MaxPicDpbSize, which is a positive integer such as six. When MaxDpbSize is equal to MaxPicDpbSize (i.e., the first number), each of the frame buffers in the DPB correspond to a maximum frame buffer size for storing a decoded picture having a maximum picture resolution. The processing device sizes each frame buffer of the DPB in units corresponding to a maximum coding block size, such as when the maximum coding block size among plural coding block sizes equals or corresponds to a 64×64 luma sample block. Upon receiving a first auxiliary information corresponding respectively to the first CVS, said first auxiliary information corresponding to the first picture resolution, the processing device determines a first frame buffer size corresponding to the first picture resolution, such first frame buffer size in units corresponding to the largest coding block size (e.g., 64×64). The processing device further determines a second number for the value of MaxDpbSize according to the magnitude of the first frame buffer size in relation to the magnitude of the maximum frame buffer size, where the second number is different than the first number.

In one embodiment, the auxiliary information corresponding respective to the second CVS of two consecutive CVSes may signal a change in picture resolution for the coded pictures in the second CVS, such picture resolution change being with respect to the picture resolution corresponding to the coded pictures in the first CVS of the two consecutive CVSes. Effectively this corresponds to a change in picture resolution from the last coded picture of the first CVS to the first coded picture in a second CVS that immediately follows the first CVS. For instance, the native picture resolution of a video signal corresponding to a television service may be different than the picture resolution of the coded pictures in one or more CVSes corresponding to a commercial segment. The auxiliary information may be included in the bitstream in advance of the change in the picture resolution. The VP system may, based on the picture resolution and a level of encoding associated with the bitstream, determine the value of MaxDpbSize based on the ratio of the DPB's frame buffer size required to store the decoded pictures with a first picture resolution and the maximum frame buffer size (as described previously). The MaxDpbSize is determined to enable transition from one picture resolution to another picture resolution in two consecutive CVSes without having to deallocate and reallocate the memory allocated for the DPB.

MaxDpbSize is influenced according to the largest or maximum picture size (in terms of total number of pixels in the spatial picture resolution) carried among the coded pictures of a bitstream expected by a decoder compliant to the video coding specification, which is therefore according to the maximum picture resolution corresponding to a specified Level of the video coding specification In a particular bitstream encoded at a given encoding level, the largest picture size among plural alternate picture resolutions may correspond to a main picture resolution. Alternate picture resolutions, may be inserted or provided in certain segments or intervals in the bitstream. For instance, an advertisement segment may be inserted at a device, such as a splicing device.

One benefit of variable number of picture buffers in the DBP is that their corresponding memory management at the VP device may be facilitated. For instance, de-allocation and reallocation of linearly allocated memory for MaxDpbSize equal to MaxPicDpbSize according to the embodiments specified herein aloow for changing picture resolution gracefully without having to deallocate and reallocate the memory corresponding to the DPB.

Certain embodiments disclosed herein address the allocation of memory corresponding to the DPB that is required for a video decoder to be compliant to a specified level, which is according to its maximum picture resolution, resulting in memory allocated for MaxPicDpbSize. Further, according to the largest or maximum picture size among the plural alternate picture sizes, the allocation of memory is such that a fixed amount of linear memory for the DPB is allocated by the a compliant decoder, such as one in VP device, for the particular encoding level and hence to support the level's maximum or largest picture resolution. Thus, the amount of memory may be allocated and reserved as available for processing (e.g., decoding) coded pictures of a bitstream based on the largest picture size.

Note that largest picture size and maximum picture size herein mean the same, and may be further referred to the picture size corresponding to MaxLumaFS.

For a CVS of the bitstream having a smaller picture resolution, the same memory allocation may persist. For such portions with smaller picture sizes than the largest picture size (among the plural anticipated picture resolutions), memory is not de-allocated and re-allocated.

Auxiliary information corresponding to each respective CVS of the bitstream is provided prior to a change of picture resolution with respect to the immediately prior CVS. Furthermore, the auxiliary information for a respective picture resolution may not change throughout the bitstream, yet it may not correspond to the maximum picture size (i.e., be a smaller picture resolution). Furthermore MaxDpbSize may or may not be equal to MaxPicDpbSize. For instance, when the auxiliary information is provided periodically, it may be provided prior to the first picture of each successive CVS in the bitstream and yet the picture resolution may not change. Similarly, the picture resolution in one embodiment may change but not equal to the maximum picture resolution of the level, yet memory for the DPB is allocated according to the maximum picture size, and the maximum frame buffer size (of the DPB) always affects the determination of MaxDpbSize.

In one embodiment, the VP device implements the DPB as a circular buffer of linear allocated memory, for instance, such as when implemented using DDR memory. Units of memory may be allocated in accordance to the worst case coding block or region, such as corresponding to a 64 by 64 luma sample region, which corresponds to 4 Kbytes when samples are 8 bits. Chroma (Cr and Cb) samples may be allocated separately but similarly. The linear memory may be demarcated at boundaries corresponding to the start of each frame buffer in the DPB. Each picture stored in the DPB corresponds to a decoded picture used as reference picture or a picture yet to be output.

Note that throughout this specification frame buffer of the DPB and picture buffer of the DPB mean the same, unless otherwise specifically stated.

In one embodiment, a maximum amount of linear memory required for a bitstream encoded at a encoding level may correspond to a number of picture buffers in the DPB (also referred to as MaxDpbSize in this disclosure) corresponding to a maximum picture size for the encoding level. The disclosure provides a mechanism to increase MaxDpbSize for pictures smaller than the maximum picture size as a function of units of 64×64 samples, maximum number of reorder pictures, sample rate. The disclosure may further provide a mechanism for mapping in linear memory of the smaller pictures' DPB picture buffers to the DPB picture buffers corresponding to the maximum picture size.

As an example, some applications may require transitioning between two CVSes in a bitstream that have different picture sizes but have the same fixed picture rate (for output) or a different sample rate. As an example, such applications may also require support to and from a CVS at twice the fixed picture rate or sample rate when the picture size is less than or equal to half the maximum picture size. To support transitions from one to another picture resolution in two consecutive CVSes, a maximum amount of linear memory required for MaxPicDpbSize may consist of a maximum number of DPB picture buffers of size equal to MaxPicSize, and the DPB picture buffers of MaxPicSize are consecutive in linear memory, without gaps between them. The linear memory corresponding to MaxPicDpbSize may be demarcated at boundaries that start each of the consecutive DPB picture buffers of MaxPicSize. The end of the linear memory may to correspond to the end of a DPB picture buffer of MaxPicSize, and wrap around to the start of the linear memory, which corresponds to the start of a different DPB picture buffer of MaxPicSize.

This disclosure proposes a mechanism which provides plural MaxDpbSize values, such as four values corresponding. four different positive integers) for luma picture sizes equal to a factor of 0.5, 0.667, 0.75, and 1.0 of the maximum luma picture size (MaxLumaFS), with the amount of linear memory fixed for all four MaxDpbSize values. The amount of linear memory for any picture size may be constant and equal to the level's MaxLumaFS. Any picture sized in 64×64 luma sample increments may be provided with a MaxDpbSize value that corresponds to the closest but larger of the four respective luma picture sizes. Furthermore, the MaxDpbSize is limited when the luma picture size changes in the bitstream, providing means to output DPB pictures yet to be output since memory allocated for the DPB does not have to be deallocated when the picture resolution changes. In one embodiment, the option to allow output pictures yet to be output may limit changes in luma sample rate, or may require a fixed picture rate through the two consecutive coded video sequences where a change in picture size occurs.

In this description MaxLumaFS may denote a level's maximum luma picture size; LumaFS may represent a luma picture size less than or equal to MaxLumaFS; MaxLumaPR may denote the maximum luma sample rate; LumaPR may represent a luma sample rate less than or equal to MaxLumaPR; MaxPicDpbSize may be the MaxDpbSize corresponding to MaxLumaFS; and MaxMem may represent the maximum amount of linear memory implied from the MaxPicDpbSize consecutive buffers of equal size, each corresponding to the MaxLumaFS of the level.

In one embodiment, every LumaFS value may correspond to the smallest number of 64 horizontal units and 64 vertical units that respectively encompass the width and height of the luma samples of the picture. The size of each DPB buffer may correspond to 64×64 luma sample increments. Note that the "64 by 64" units may correspond to luma samples and furthermore to the largest block size among plural block sizes, such block sizes corresponding to the blocks in the grid of blocks mapped onto each picture for the purpose of coding.

When LumaFS is not equal to a factor of 0.5, 0.667, 0.75, and 1.0 of MaxLumaFS, the consecutive DPB buffers of equal size in MaxMem that correspond to LumaFS are a larger number of 64×64 units than the actual LumaFS. The benefit in exchange is that a decoder may not have to perform memory de-allocation or reallocation since each DPB buffer is demarcated by a pointer to the start of the buffer and the end by the LumaFS increment. In one embodiment, LumaFS, corresponds to a value that equals a multiple of 64×64 units. The number of luma samples in pictures is used for purposes of deriving MaxDpbSize but the chroma samples in a picture are respectively implied.

For decoder conformance, the MaxDpbSize may be implied by MaxLumaPR (maximum rate of decoded luma samples). In some cases, the MaxDpbSize may be implied by a maximum rate of output luma samples, such as when the rate of output luma samples equals the value of the level's MaxLumaPR and the rate of decoded luma sample is less than MaxLumaPR. The case may manifest when pictures are output more than once (e.g., when fixed_pic_rate_flag=1 and the coded picture rate in a CVS is less than the output picture rate).

The disclosed derivation of the MaxDpbSize may be based on respective parameter or variable values of any two consecutive CVSes, such as the clock tick value, picture size, the maximum number of reorder picture, MaxReorderNum, and the value of fixed_pic_rate_flag. Since the DPB may store reference pictures or pictures yet to be output, and includes a picture buffer for the current decoded picture, a maximum number of recorder pictures (also referred to as MaxReorderNum) for the level's MaxPicSize is equal MaxPicDpbSize minus one.

In one example embodiment, in a bitstream the fixed_pic_rate_flag is equal to 1 in the two consecutive CVSes. The no_output_of_prior_pics_flag, if present, is according to its value, and not inferred. The no_output_of_prior_pics_flag may be present and equal to zero. The respective MaxDpbSize and MaxReorderNum for smaller picture sizes are derived by considering a transition from a CVS with pictures of MaxPicSize, and a second transition back to a CVS with pictures of MaxPicSize. The picture buffers may be mapped to the larger consecutive DPB picture buffers of MaxPicSize in the demarcated linear memory that corresponds to the level's MaxPicDpbSize. Constraints on the maximum number of reorder pictures may be obtained by considering: the DPB pictures in the preceding CVS that are yet to be output, and the size of the DPB picture buffers and their respective mapping within the demarcated picture buffers of MaxPicSize in the linear memory corresponding to the level's MaxPicDpbSize.

In one embodiment, the value of clock tick must be the same for the two consecutive CVSes, except for a CVS with a picture size less than or equal half of MaxPicSize, when the clock tick may be half or equal to the clock tick of the other CVS. Otherwise, the value of the no_output_of_prior_pics_flag must be equal or inferred equal to 1. The scenario when the clock tick is half is discussed in later part of the disclosure.

As discussed previously, the respective MaxDpbSize and MaxReorderNum for a CVS may be provided for plural different picture sizes, such as four different picture sizes, in relation to the level's MaxPicSize (i.e. in relation to a picture ratio). The four different picture ratios may include: less than or equal to 0.5×MaxPicSize, greater than 0.5×MaxPicSize but less than or equal to 0.667×MaxPicSize, greater than 0.667×MaxPicSize but less than or equal to 0.75×MaxPicSize, and greater than 0.75×MaxPicSize but less than or equal to 1.0×MaxPicSize. Each of the four picture ratios are discussed in detail in following part of the disclosure.

In the first scenario, when the picture ratio is less than or equal to 0.5×MaxPicSize, two picture buffers may be mapped into each of the respective demarcated MaxPicDpbSize picture buffers of MaxPicSize to obtain:

$$MaxDpbSize=2\times MaxPicDpbSize$$

To allow a transition back to a CVS with pictures of MaxPicSize, consideration may be given to the worst case occupation of the DPB picture buffers, each of size equal to 0.5×MaxPicSize, in the linear memory that corresponds to MaxPicDpbSize. For the pictures having the first picture ratio, the number of recorder pictures may be calculated as:

$$MaxReorderNum=MaxPicSizeDpb-1$$

In an embodiment, for the pictures having the picture ratio in range of less than or equal to 0.5×MaxPicSize, the MaxDpbSize may be reduced and the MaxReorderNum may be increased, according to the following equations:

$$MaxDpbSize=2\times(MaxPicDpbSize-1), \text{ and}$$

$$MaxReorderNum=MaxPicDpbSize$$

In the second scenario, when the picture ratio is greater than 0.5×MaxPicSize but less than or equal to 0.667×MaxPicSize, three consecutive picture buffers may be mapped into each respective set of two consecutive picture buffers of 1.0×MaxPicSize. The number of picture buffers in the DBP for the second scenario may be calculated as:

$$MaxDpbSize=\text{floor}(1.5\times MaxPicDpbSize)$$

For the CVS having the picture ratio in range of greater than 0.5×MaxPicSize but less than or equal to 0.667×MaxPicSize, the number of recorder pictures may be calculated as:

$$MaxReorderNum=MaxPicDpbSize-2$$

In the third scenario, for the CVS with picture ratio in a range of greater than 0.667×MaxPicSize but less than or equal to 0.75×MaxPicSize, four consecutive picture buffers may be mapped into each respective set of three consecutive picture buffers of 1.0×MaxPicSize. The number of picture buffers in the DBP for the third scenario may be calculated as:

$$MaxDpbSize=\text{floor}(4\times MaxPicDpbSize/3), \text{ and}$$

For the CVS having the picture ratio in range of greater than 0.667×MaxPicSize but less than or equal to 0.75×MaxPicSize, the number of recorder pictures may be calculated as:

$$MaxReorderNum=MaxPicDpbSize-3$$

In the fourth scenario, for the CVS with picture ratio in a range of greater than 0.75×MaxPicSize but less than or equal to 1.0×MaxPicSize, each respective picture buffer may be mapped into a corresponding respective picture buffer of 1.0×MaxPicSize. The number of picture buffers in the DBP for the fourth scenario may be calculated as:

$$MaxDpbSize=MaxPicDpbSize, \text{ and}$$

For the CVS having the picture ratio in range of greater than 0.75×MaxPicSize but less than or equal to 1.0×MaxPicSize, the number of recorder pictures may be calculated as:

MaxReorderNum=MaxPicDpbSize−1

In one embodiment, for a bitstream, having the fixed_pic_rate_flag equals zero in one of both of the two consecutive CVSes, the no_output_of_prior_pics_flag, if present, is according to its value, and may not be inferred. The no_output_of_prior_pics_flag may be present and equal to zero. The value of clock tick may be the same for any two consecutive CVSes, except for a CVS with a picture size less than or equal half of MaxPicSize, when the clock tick may be half or equal to the clock tick of the other CVS. Otherwise, the value of the no_output_of_prior_pics_flag may be equal or inferred equal to 1.

The respective MaxDpbSize and maximum number of reorder pictures may be provided for two different picture sizes in relation to the level's MaxPicSize: less than or equal to 0.5×MaxPicSize, and greater than 0.5×MaxPicSize but less than or equal to 1.0×MaxPicSize.

For the picture size less than or equal to 0.5×MaxPicSize, two picture buffers may be mapped into each of the respective demarcated MaxPicDpbSize picture buffers of MaxPicSize to obtain, a number of picture buffers for the CVS as:

MaxDpbSize=2*MaxPicDpbSize

To allow a transition back to a CVS with pictures of MaxPicSize, consideration may be given to the worst case occupation of the DPB picture buffers, each of size equal to 0.5×MaxPicSize, in the linear memory that corresponds to MaxPicDpbSize. The number of recorder pictures for the picture size less than or equal to 0.5×MaxPicSize may be calculated based on the following equation:

MaxReorderNum=MaxPicDpbSize−1

For the picture size greater than 0.5×MaxPicSize but less than or equal to 1.0×MaxPicSize, each respective picture buffer may be mapped into a corresponding respective picture buffer of 1.0×MaxPicSize to obtain, a number of picture buffers for the CVS as:

MaxDpbSize=MaxPicDpbSize, and

The number of recorder pictures for the picture size greater than 0.5×MaxPicSize but less than or equal to 1.0×MaxPicSize may be calculated based on the following equation:

MaxReorderNum=MaxPicDpbSize−1

In one embodiment, the disclosure may further provide a variable number of pictures in the DBP (MaxDbpSize) for both scenarios, i.e. when the MaxDbpSize is constant (such as 6) for all encoding levels, and when the MaxDbpSize is not constant. In a scenario, when the MaxDpbSize is equal to 6 for all levels, the MaxDpbSize is determined according to what the following table:

MaxDpbSize Limits Based on Luma Picture Size (LumaFS)

| LumaFS | MaxDpbSize |
| --- | --- |
| LumaFS ≤ 0.5 * MaxLumaFS | 12 |
| 0.5 < LumaFS ≤ 0.667 * MaxLumaFS | 9 |
| 0.667 < LumaFS ≤ 0.75 * MaxLumaFS | 8 |
| 0.75 < LumaFS ≤ 1.0 * MaxLumaFS | 6 |

In the first row of the above table, the two picture buffers of LumaFS are mapped into each picture buffer corresponding to MaxLumaFS. In the second row, three picture buffers are mapped into each respective set of two consecutive picture buffers corresponding to MaxLumaFS. In the third row, four picture buffers are mapped into each respective set of three consecutive picture buffers corresponding to MaxLumaFS.

In a second scenario case, when the MaxDpbSize is not constant, the MaxDpbSize may become a function MaxPicDpbSize in the next Table. The value of MaxDpbSize is determined according to the following table:

MaxDpbSize Limits Based on Luma Picture Size (LumaFS) and Level's MaxPicDpbSize

| LumaFS | MaxDpbSize |
| --- | --- |
| LumaFS ≤ 0.5 * MaxLumaFS | Min(2*MaxPicDpbSize, 16) |
| 0.5 < LumaFS ≤ 0.667 * MaxLumaFS | Min (Floor(3*MaxPicDpbSize/2), 16) |
| 0.667 < LumaFS ≤ 0.75 * MaxLumaFS | Min (Floor(4*MaxPicDpbSize/3), 16) |
| 0.75 < LumaFS ≤ 1.0 * MaxLumaFS | MaxPicDpbSize |

In the preceding table, the MaxDpbSize value for any luma picture size may correspond to the smallest of the four preset luma picture sizes that is greater or equal to the picture size.

As discussed previously, in a number of broadcast applications, the frame size changes from one CVS to another, for instance when an advertisement of different resolution is inserted in a bitstream. When the second of the two consecutive CVSes has a smaller frame resolution (and hence frame size), the decoder may be afford to use more number of frame buffers in the DPB. The more number of frame buffers, may provide the encoder, flexibility to encode such CVSes (CVSes with smaller frame size) with more number of reference pictures during inter-prediction which in turn improves the compression quality. In one embodiment, an upper bound on MaxDpbSize based on the frame size and framerate of the CVSes may be implemented. Further, vps_num_reorder_pics [temporal_id] may also be considered while deciding MaxDpbSize for a level L (L) in order to efficiently use the DPB.

Let MaxDpbSize(L) represent the maximum number of frame buffers in the DPB while decoding any CVS coded in level L and let MaxLumaFS(L) represent the maximum luma samples per frame of the CVS coded in level L. NewMaxDpbSize(L, S) may be defined as the new MaxDpbSize for CVS S (width horiz and height vert) coded in level L, using the following equations.

$$\text{max\_}lcu\text{\_width}=2^k (\text{example: } 64) \quad (1)$$

$$\text{max\_}lcu\text{\_height}=2^l (\text{example: } 64) \quad (2)$$

$$\text{max\_}lcu\text{\_units}(L)=\text{ceiling}(\text{MaxLumaFS}(L)/(\text{max\_}lcu\text{\_height}*\text{max\_}lcu\text{\_width})) \quad (3)$$

$$cvs\_lcu\text{\_units}=\text{ceiling}(\text{vert}/\text{max\_}lcu\text{\_height})*\text{ceiling}(\text{horiz}/\text{max\_}lcu\text{\_width}) \quad (4)$$

In one embodiment, a default configuration for maximum number of picture buffers for all encoding levels may be defined as 6. The DPB may be assumed to be split into 6 buckets of equal size as shown below in table 1:

TABLE 1

| 0 | 1 | 2 | 3 | 4 | 5 |
|---|---|---|---|---|---|

In one embodiment, the entire DPB from Table 1 may be split into 12 buckets of equal size as shown below in table 2:

TABLE 2

| 0 | 2 | 4 | 6 | 8 | 10 |
|---|---|---|---|---|----|
| 1 | 3 | 5 | 7 | 9 | 11 |

In another embodiment, the DPB may be split into 11 buckets (10 of which are of equal size and one is double the size of the remaining 10) as shown below in table 3. The 11th bucket may be reserved for the transition from one portion to another portion of the bitstream.

TABLE 3

| 0 | 2 | 4 | 6 | 8 | 10 |
|---|---|---|---|---|----|
| 1 | 3 | 5 | 7 | 9 |    |

The maximum number of recoreder pictures, also referred to as vps_num_reorder_pics, (i.e. vps_max_temporal_layers_minus1) is required to be at most 5 for the full frame size CVS. Further, when cvs_lcu_units is less than or equal to max_lcu_units, the following table gives the value of NewMaxDpbSize for the second CVS and the DPB configuration used.

TABLE 4

| vps_num_reorder_pics (vps_max_temporal_layers_minus1) of the half frame size CVS | NewMaxDpbSize(L, S) for half frame size CVS |
|---|---|
| <= 5 | 12 (first DPB config) |
| 6 | 10 (second DPB config) |

In one embodiment, it may be understood that fixed picture rate may refer to fixed frame rate. The fixed picture rate refers to either a fixed rate of picture fields or a fixed rate of frames, where the frames correspond to progressive pictures. In an alternate embodiment, the fixed picture rate may refer to a fixed rate of frames that may comprise of every two consecutive pairs of fields, either a top field and a corresponding bottom field paired consistently throughout the bitstream, or a bottom field and a corresponding top field paired consistently throughout the bitstream. The type of pairings may be switched at the start of a CVS in the bitstream. In yet another embodiment, the fixed picture rate may refer to a rate of pictures that are either field or frames, both treated as progressive pictures for coding purposes but for output purposes a field inferred as a top or bottom field, each corresponding respectively to the set of every other spatial line implied by top and bottom, and a frame as a progressive frame of consecutive lines.

Embodiments of the present disclosure may be generally implemented as part of a subscriber television system such as a digital broadband delivery system (DBDS) or cable television system (CTS). For example, a subscriber television system (STS) and its operation will be described initially, with the understanding that other conventional data delivery systems are within the scope of the preferred embodiments of the present disclosure. FIG. 1A shows a block diagram view of a subscriber television system (STS) 10, which is generally a high quality, reliable and integrated network system that is preferably capable of delivering video, audio, voice and data services to digital home communication terminals (DHCTs) 16. Although FIG. 1A depicts a high level view of a CTS 10, it should be appreciated that a plurality of subscriber television systems can tie together a plurality of regional networks into an integrated global network so that DHCT users can receive media content provided from anywhere in the world.

Further, it will be appreciated that the STS 10 shown in FIG. 1A is merely illustrative and should not be construed as implying any limitations upon the scope of the preferred embodiments of the present disclosure. For instance, subscriber television systems also included within the scope of the embodiments of the disclosure include systems not utilizing physical structured cabling for transmission, such as, but not limited to, satellite systems. Further, transmission media included within the scope of the preferred embodiments of the disclosure include, but are not limited to, hybrid fiber/coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 preferably delivers broadcast video signals as digitally formatted signals in addition to delivering traditional broadcast analog video signals. Furthermore, the system can preferably support one way broadcast services as well as both one-way data services and two-way media content and data services. The two-way operation of the network preferably allows for user interactivity with services, such as Pay-Per-View programming, Near Video-On-Demand (NVOD) programming according to any of several known NVOD implementation methods, View-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1A, a typical STS 10 comprises a head end 11, hubs 12, an HFC access network 17, and DHCTs 16. It should be appreciated that although a single component (e.g. a head end) is illustrated in FIG. 1A, a STS 10 can feature a plurality of any one of the illustrated components or may be configured with alternative embodiments for any one of the individual components or with yet other additional components not enumerated above.

Media content provided by one or more content providers (not shown) is communicated by the content providers to one or more head ends 11. From those head ends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which, in one implementation, is connected to a network interface unit (NIU) 15 which is connected to a digital home communication terminal (DHCT) 16. In other implementations, the HFC node 13 is connected directly to a DHCT 16. The NIU 15, when implemented, is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers. As the high-level operations of many of the functions of a subscriber television system (STS) 10 are well known to those of ordinary skill in the art, further high level description of the overall STS 10 of FIG. 1A will not be contained herein.

FIG. 1B is a block diagram illustrating the transmission signals supported by the STS 10 (FIG. 1A), where the transmission signals 60, 64, 68, 72 and 76 are input into a DHCT 16 in accordance with embodiments of the disclosure. Preferably, one or more content providers (not shown) provide the content that is included in the transmission signals. Transmission signals can be generated at a headend 11 or at a hub 12 (FIG. 1A) that might function as a mini-headend and which therefore possesses some of the headend functionality. In some implementations, the transmission signals can be provided by one or more of the content providers.

As depicted in FIG. 1B, the STS 10 (FIG. 1A) can simultaneously support a number of transmission signal types, transmission rates, and modulation formats. The ability to carry analog and digital signals over a large bandwidth are characteristics of a Hybrid Fiber/Coax (HFC) Network typically employed in a STS, as in the STS 10 of FIG. 1A. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, a STS 10 using HFC supports downstream (i.e., in the direction from the headend 11 to the DHCT 16) frequencies from 50 MHz to 870 MHz, whereas upstream frequencies (i.e., in the direction from the DHCT 16 to higher levels of the system) are in the 5 MHz to 42 MHz band. Generally, the RF bandwidth spacing for analog and digital services is 6 MHz. Furthermore, for a typical 870 MHz system in the U.S., a possible downstream RF spectrum subdivision plan uses 6 MHz spaced frequency subdivisions, or spans, within the 50 MHz to 550 MHz band for analog video transmission signals and within the 550 MHz to 870 MHz range for digital transmission signals. The Analog Transmission Signals (ATSS) 60 shown in FIG. 1B are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio.

Referring again to FIG. 1B, the downstream direction transmission signals, having been multiplexed, and in embodiments using frequency division multiplexing (FDM), are often referred to as in-band transmission signals and include Analog Transmission Signals (ATSs) 60 and Digital Transmission Signals (DTS) 64, 68, 72 (also known as Digital Transport Signals). These transmission signals carry video, audio and data services. For example, these transmission signals may carry television signals, Internet data, or any additional types of data, such as Electronic Program Guide (EPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 60, the DTCs 64, 68, 72 each occupies 6 MHz of the RF spectrum. However, the DTSs 64, 68, 72 are digital transmission signals consisting of 64- or 256-Quadrature Amplitude Modulated (QAM) digital signals formatted as MPEG-2 transport streams, allocated in a separate frequency range. As will be described in more detail below, the MPEG-2 transport stream enables transmission of a plurality of DTS types over each 6 MHz RF spacing, as compared to a 6 MHz ATSk. The three types of digital transport signals illustrated in FIG. 1B include broadcast digital transmission signals 64, carousel digital transmission signals 68, and on-demand transmission signals 72.

MPEG-2 transport may be used to multiplex video, audio, and data in each of these Digital Transmission Signals (DTSs). However, because an MPEG-2 transport stream allows for multiplexed video, audio, and data into the same stream, the DTSs do not necessarily have to be allocated in separate 6 MHz RF frequencies, unlike ATSs 60. On the other hand, each DTS is capable of carrying multiple broadcast digital media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal can carry the video and audio streams of the media content instances of multiple television (TV) stations, as well as media content and data that is not necessarily related to those TV media content instances, as compared to one TV channel broadcast over one ATS 60 that consumes the entire 6 MHz. The digital data is inserted into MPEG-2 transport streams carried through each 6 MHz frequency subdivision assigned for digital transmission, and then de-multiplexed at the subscriber DHCT so that multiple sets of data can be produced within each tuned 6 MHz frequency span, or subdivision.

Although broadcast in nature, the carousel DTSs 68 and on-demand DTSs 72 offer different functionality. Continuing with FIG. 1B, the broadcast DTSs 64 and carousel DTSs 68 typically function as continuous feeds for indefinite time, whereas the on-demand DTSs 72 are continuous feeds sessions for a limited time. All DTS types are capable of being transmitted at high data rates. The broadcast DTSs 64 carry typical data comprising multiple digitally video encoded and formatted TV source signals and other continuously fed data information. The carousel DTSs 68 carry broadcast media content or data that is systematically broadcast in a cycling fashion but updated and revised as needed. Thus, the carousel DTSs 68 serve to carry high volume data such as media content and data and possibly, other data at high data rates. The carousel DTSs 68 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 72, on the other hand, can carry particular information such as coded video and audio pertaining to subscriber requested media content instance preview and/or media content instance descriptions, as well as other specialized data information.

The User-to-Network Download Protocol of the MPEG-2 standard's DSM-CC specification (Digital Storage Media-Command and Control) provides the data carousel protocol used for broadcasting data from a server located at headend 11, or elsewhere. It also provides the interactive download protocol for reliable downloading of data from a server (possibly the same server) to an individual DHCT through the on-demand DTSs. Each carousel and on-demand DTS is defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 1B are Out-Of-Band (OOB) signals that provide continuously available two-way signaling to the subscribers' DHCT 16 regardless of which in-band signals are tuned to by the individual DHCT in-band tuners, as described below. The OOB signals consists of a Forward Data Signal (FDS) 76 and a Reverse Data Signal (RDS) 80. The OOB signals can comply to any one of a number of well known transport protocols but preferably comply to either a DAVIC 1.1 Transport Protocol with FDS of 1.544 mega-bits per second (Mbps) or more using quadrature phase shift keying (QPSK) modulation and an RDS of 1.544 Mbps or more using QPSK modulation, or to a DOCSIS Transport Protocol with FDS of 27 Mbps using 64-QAM modulation and a RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

Figure 2:
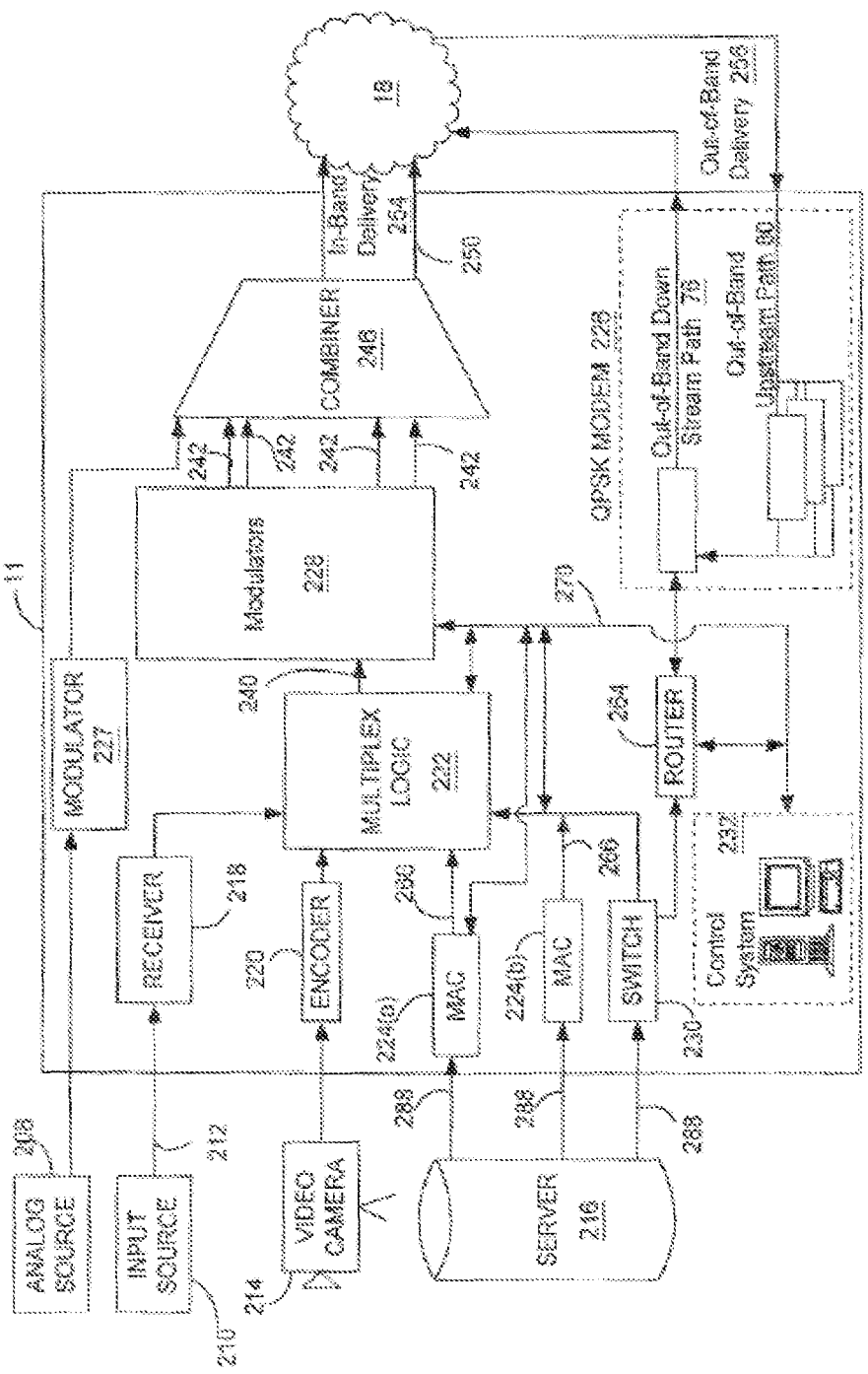
FIG. 2 is an overview of a headend, which provides the interface between the STS and the service and content providers.

FIG. 2 is an overview of a headend 11, which provides the interface between the STS 10 and the service and content providers. The overview of FIG. 2 is equally applicable to a hub 12, and the same elements and principles may be implemented at a hub 12 instead of the headend 11 as described herein. The headend 11 receives content from a variety of service and content providers, which can provide input in a variety of ways. The headend 11 combines the content from the various sources and distributes the content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown). The headend 11 can also receive content from a direct feed source 210 via a direct line 212. Other input sources from content providers include a video camera 214, analog input source 208, or an application server 216. The application server 216 may include more than one line of communication. One or more components such as analog input source 208, input source 210, video camera 214, and application server 216 can be located external to the headend 11, as shown, or internal to the headend as would be appreciated by one having ordinary skill in the art. The signals provided by the content or programming input sources can include a single media content instance (i.e. individual instances of media content such as an episode of a television show, a movie, or web-page, etc.) or a multiplex that includes several media content instances.

The headend 11 generally includes one or more receivers 218 that are each associated with a content source. Video encoders, such as encoder 220, are included for digitally encoding at least some local programming or a real-time feed from video camera 214, or the like. Video encoder 220 outputs the respective coded video and audio streams corresponding to the analog audio/video signal received at its input. For example, video encoder 220 can output bitstreams packetized elementary (PES) streams or transport streams compliant to the syntax and semantics of the transport portion of the ISO MPEG-2 standard systems specification, respectively. The PES or transport streams may be multiplexed with input signals from switch 230, receiver 218 and control system 232. The multiplexing logic 222 processes the input signals and multiplexes at least a portion of the input signals into transport stream 240.

Analog input source 208 can provide an analog audio/video broadcast signal, which can be input into modulator 227. From modulator 227, a modulated analog output signal can be combined at combiner 246 along with other modulated signals for transmission into transmission medium 250. Alternatively, analog audio/video broadcast signal from analog input source 208 can be input into modulator 228. Alternatively, analog audio/video broadcast signal can be input directly from modulator 227 to transmission medium 250. The analog broadcast media content instances are transmitted via respective radio-frequency (RF) channels, each assigned for transmission of an analog audio/video signal such as NTSC video, as described in association with FIG. 1B.

The switch, such as asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers may download content to an application server located within the STS 10. The application server 216 may also be located within the headend 11 or elsewhere within the STS 10, such as in a hub 12. The various inputs into the headend 11 are then combined with the other information from the control system 232, which is specific to the STS 10, such as local programming and control information, which can include among other things conditional access information. The headend 11 contains one or more modulators 228 to convert the received transport streams 240 into modulated output signals suitable for transmission over the transmission medium 250 through the network 18. Each modulator 228 may be a multimodulator including a plurality of modulators, such as, but not limited to, QAM modulators, that radio frequency modulate at least a portion of the transport streams 240 to become output transport streams 242. The output signals 242 from the various modulators 228 or multimodulators are combined, using equipment such as a combiner 246, for input into the transmission medium 250, which is sent via the in-band delivery path 254 to subscriber locations (not shown). In-band delivery path 254 can include DTSs 64, 68, 72, and ATS 60, as described with FIG. 1B. In one example, the server 216 also provides various types of data 288 to the headend 11.

The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the content distributed to subscribers. Information, such as conditional access information, is communicated from the control system 232 to the multiplexing logic 222 where it is multiplexed into a transport stream 240.

Among other things, the control system 232 provides input to the modulator 228 for setting the operating parameters, such as selecting certain media content instances or portions of transport streams for inclusion in one or more output transport streams 242, system specific MPEG table packet organization, and/or conditional access information. Control information and other data can be communicated to hubs 12 and DHCTs 16 via an in-band delivery path 254 or via an out-of-band delivery path 256.

The out-of-band data is transmitted via the out-of-band FDS 76 (FIG. 1B) of transmission medium 250 by means such as, but not limited to, a Quadrature Phase-Shift Keying (QPSK) modem array 226. Two-way communication utilizes the RDS 80 (FIG. 1B) of the out-of-band delivery path 256. Hubs 12 and DHCTs 16 transmit out-of-band data through the transmission medium 250, and the out-of-band data is received in headend 11 via out-of-band RDS 80. The out-of-band data is routed through router 264 to an application server 216 or to control system 232. The out-of-band control information includes such information as a pay-per-view purchase instruction and a pause viewing command from the subscriber location to a video-on-demand type application server located internally or external to the headend 11, such as application server 216, as well as any other data sent from the DHCT 16 (FIG. 1A) or hubs 12, all of which will preferably be properly timed. The control system 232 also monitors, controls, and coordinates all communications in the subscriber television system, including video, audio, and data. The control system 232 can be located at headend 11 or remotely.

The transmission medium 250 distributes signals from the headend 11 to the other elements in the subscriber television system, such as a hub 12, a node 13, and subscriber locations (FIG. 1A). The transmission medium 250 can incorporate one or more of a variety of media, such as optical fiber, coaxial cable, and hybrid fiber-coax (HFC), satellite, direct broadcast, or other transmission media.

Figure 3:
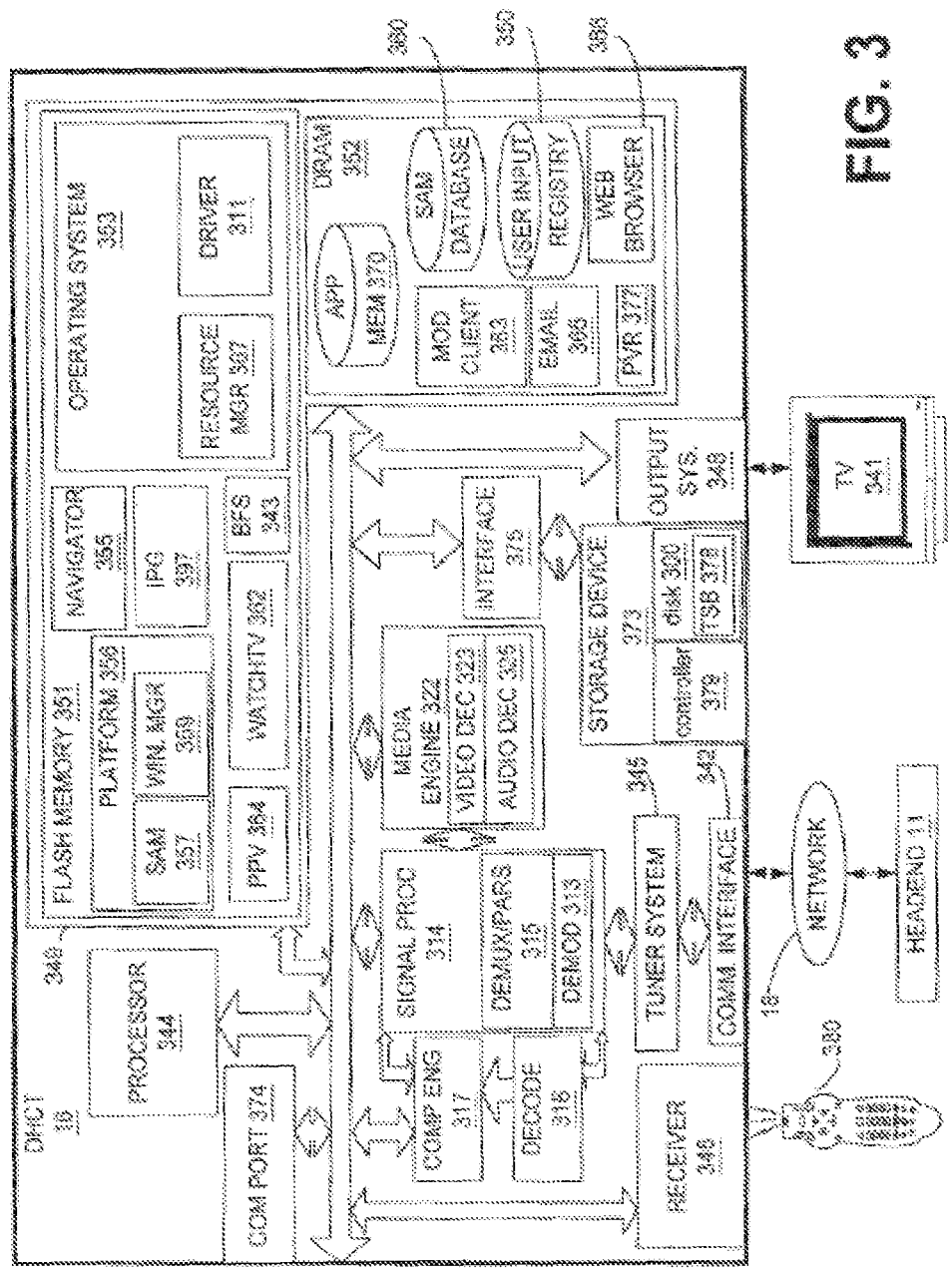
FIG. 3 is a block diagram illustration of a DHCT 16 that is coupled to a headend and to a television.

FIG. 3 is a block diagram illustration of a DHCT 16 that is coupled to a headend 11 and to a television, in accordance with one implementation. It will be understood that the DHCT 16 shown in FIG. 3 is merely illustrative and should not be construed as implying any limitations upon the scope of the preferred embodiments of the disclosure. For example, some of the functionality performed by applications executed in the DHCT 16 (such as the MOD client application 363) may instead be performed at the headend 11 and vice versa, or not at all in some embodiments. A DHCT 16 is typically situated at a user's residence or place of business and may be a stand alone unit or integrated into another device such as, for example, a television set or a personal computer or other display devices or an audio device. The DHCT 16 preferably includes a communications interface 342 for receiving signals (video, audio and/or other data) from the headend 11 through the network 18 and for providing any reverse information to the headend 11 through the network 18.

The DHCT 16 further preferably includes at least one processor 344 for controlling operations of the DHCT 16, an output system 348 for driving the television display 341, and a tuner system 345 for tuning into a particular television channel or frequency to be displayed and for sending and receiving various types of data or media content to and from the headend 11. The DHCT 16 may include, in other embodiments, multiple tuners for receiving downloaded (or transmitted) media content. Tuner system 345 can select from a plurality of transmission signals (FIG. 1B) provided by the subscriber television system. Tuner system 345 enables the DHCT 16 to tune to downstream media and data transmissions, thereby allowing a user to receive digital or analog media content delivered in the downstream transmission via the subscriber television system. The tuner system 345 includes, in one implementation, an out-of-band tuner for bi-directional quadrature phase shift keying (QPSK) data communication and a quadrature amplitude modulation (QAM) tuner (in band) for receiving television signals. Additionally, a receiver 346 receives externally-generated information, such as user inputs or commands from an input device or other devices.

According to another embodiment of the disclosure, a telephone modem (not shown) in the DHCT 16 can be utilized for upstream data transmission and a headend 11, hub 12 (FIG. 1A) or other component located upstream in the STS 10 (FIG. 1A) can receive data from a telephone network corresponding with the telephone modem and can route the upstream data to a destination internal or external to the STS 10, such as an application data server in the headend 11 or content provider.

The DHCT 16 includes signal processing system 314, which comprises demodulating system 313 and transport demultiplexing and parsing system 315 (herein demultiplexing system) to process broadcast media content and/or data. One or more of the systems of signal processing system 314 can be implemented with software, a combination of software and hardware, or preferably in hardware. Demodulating system 313 comprises functionality for RF signal demodulation, either an analog transmission signal or a digital transmission signal. For instance, demodulating system 313 can demodulate a digital transmission signal in a carrier frequency that was modulated, among others, as a QAM-modulated signal. When tuned to a carrier frequency corresponding to an analog TV signal transmission, demultiplexing system 315 is bypassed and the demodulated analog TV signal that is output by demodulating system 313 is instead routed to analog video decoder 316. Analog video decoder 316 converts the analog video signal (i.e. the video portion of a media content instance that comprises a video portion and an audio portion) received at its input into a respective non-compressed digital representation comprising a sequence of digitized pictures and their respective digitized audio. Presented at the input to analog video decoder 316 is an analog video signal such as NTSC video comprising of audio and video. In one implementation, the video consists of a sequence of fields spaced apart at approximately one-sixtieth of a second. A pair of consecutive fields constitutes a picture. The odd field contains the odd-numbered lines of the picture and the even field contains the even-numbered lines of the picture. Analog video decoder 316 outputs the corresponding sequence of digitized pictures and respective digitized audio. Each picture is a two dimensional entity of picture elements and each picture element contains a respective set of values. A picture element value comprises luminance and chrominance information that are representative of brightness and color information at the spatial location of the picture element within the picture.

Digitized pictures and respective audio output by analog video decoder 316 are presented at the input of compression engine 317. Digitized pictures and respective audio output by analog video decoder 316 can also be presented to an input of media engine 322 via an interface (not shown) dedicated for non-compressed digitized analog video and audio, such as ITU-656, for display on TV 341. Compression engine 317 is coupled to localized memory 349, preferably DRAM 352, for input and processing of the input digitized pictures and their respective digitized audio. Alternatively, compression engine 317 can have its own integrated memory (not shown). Compression engine 317 processes the sequence of digitized pictures and digitized audio and converts them respectively into a bitstream of one or more coded video sequences (or video bistream) and an audio compressed stream (or audio bitstream), respectively. The audio and video bitstreams are produced in accordance with the syntax and semantics of respective audio and video coding specifications, so that they can be interpreted by respectively compliant video decoder 323 and audio decoder 325 for decompression. Each compressed bitstream consists of a sequence of data packets containing a header and a payload. Each header contains a unique program identification, or PID, associated with the respective compressed stream or bitstream.

Compression engine 317 multiplexes the audio and video compressed streams into a transport stream, such as an MPEG-2 transport stream, for output. In one embodiment, compression engine 317 can preferably compress audio and video corresponding to more than one program in parallel (e.g., two tuned analog TV signals) and to multiplex the respective audio and video compressed streams into a single transport stream. Output of compressed streams and/or transport streams produced by compression engine 317 is input to signal processing system 314. Parsing capabilities 315 within signal processing 314 allow for interpretation of sequence and picture headers, for instance, annotating their locations within their respective compressed stream for future retrieval from storage device 373. A compressed analog media content instance (e.g., TV program episode or show) corresponding to a tuned analog transmission channel can be output as a transport stream by signal processing 314 and presented as input for storage in storage device 373 via interface 375 as will be described below. The packetized compressed streams can be also output by signal processed 314 and presented as input to media engine 322 for decompression by video decompression engine 323 and audio decompression engine 325 for its display on TV 341, as will be described below.

Demultiplexing system 315 can include MPEG-2 transport demultiplexing. When tuned to carrier frequencies carrying a digital transmission signal, demultiplexing system 315 enables the separation of packets of data, corresponding to the compressed streams of information belonging to the desired media content instances, for further processing. Concurrently, demultiplexing system 315 precludes packets in the multiplexed transport stream that are irrelevant or not desired, such as packets of data corresponding to compressed streams of media content instances of other media content signal sources (e.g. other TV channels), from further processing.

Parsing capabilities of demultiplexing system 315 include reading and interpreting the received transport stream without disturbing its content, such as to interpret sequence and picture headers, for instance, to annotate their locations within their respective compressed stream for future retrieval from storage device 373. Thus, the components of signal processing system 314 are capable of QAM demodulation, forward error correction, and demultiplexing transport streams, and parsing packetized elementary streams and elementary streams. A compressed media content instance corresponding to a tuned carrier frequency carrying a digital transmission signal can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 as will be described below.

One having ordinary skill in the art will appreciate that signal processing system 314 will preferably include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present disclosure, including analog signals (e.g. NTSC) that bypass one or more elements of the signal processing system 314 and are forwarded directly to the output system 348. Further, outputs presented at corresponding next-stage inputs for the aforementioned signal processing flow may be connected via accessible memory 349 in which the outputting device stores the output data and the inputting device thereafter inputs the output data written to memory 349 by the respective outputting device. Outputting and inputting devices include analog video decoder 316, compression engine 317, media engine 322, signal processing system 314, and components or subcomponents thereof. Further, it will be understood by those having ordinary skill in the art that components of signal processing system 314 can be spatially located in different areas of the DHCT 16. Further, it will be understood by those having ordinary skill in the art that, although the components of signal processing system 314 are illustrated as being in communication with an incoming signal from the communications interface 342, the signal may not necessarily be in the order shown for all signals.

The DHCT 16 also includes media engine 322, which includes digital video decoder 323 also known as video decompression engine, and digital audio decoder 325 also known as audio decompression engine, and other digital signal processing components not shown, as would be appreciated by those having ordinary skill in the art. For example, demultiplexing system 315 is in communication with tuner system 345, and processor 344 to effect reception of digital compressed bitstreams, digital compressed audio streams, and data streams corresponding to one or more media content instances to be separated from other media content instances and/or streams transported in the tuned transmission channel and to be stored in a first part (not shown) of DRAM 352 of DHCT 16 assigned to receive packets of one or more media content instances. Other dedicated memory may also be used for media content instance packets.

Furthermore, while conducting this process, demultiplexing system 315 demultiplexes and separates desired compressed streams from the received transport stream without disturbing its content. Further, parser 315 parses (i.e., reads and interprets) compressed streams such as to interpret sequence headers and picture headers, and deposits a transport stream carrying compressed streams of a media content instance into DRAM 352. Processor 344 causes transport stream in DRAM 352 to be transferred to the storage device 373 via interface 375. Under program control by processor 344, the demultiplexing system 315 in communication with the digital video decoder 323, storage device 373, and processor 344 effect notification and/or transfer of received packets of one or more compressed streams corresponding to one or more media content instances from a first part of DRAM 352 to a second part (not shown) of DRAM 352 assigned to the digital video decoder 323 and the digital audio decoder 325. Alternatively, media engine 322 can have access to a dedicated localized DRAM (not shown). Upon demultiplexing and parsing the transport stream carrying one or more media content instances, signal processing system 314 outputs to DRAM 352 ancillary data in the form of a table or data structure (not shown) comprising the relative or absolute location of the beginning of certain pictures in the compressed media content instance for convenience in retrieval during future operations.

In one implementation, compression engine 317 can output bitstreams containing CVSes that are packetized elementary streams (PES) inside a transport stream such as according to the syntax and semantics of the ISO MPEG-2 standard systems specifications. The bitstreams output by compression engine 317 corresponding to a first media content instance are deposited in local memory for compression engine 317 and routed to demultiplexing system 315. Demultiplexing system 315 parses (i.e., reads and interprets) the transport stream generated by compression engine 317 without disturbing its content, such as to interpret picture headers, and deposits the transport stream into DRAM 352. Processor 344 causes transport stream in DRAM 352 to be transferred to the storage device 373. While parsing the transport stream, demultiplexing system 315 outputs to memory 352 ancillary data in the form of a table or data structure (not shown) comprising the relative or absolute location of the beginning of certain pictures in the compressed media content stream for the first media content instance for convenience in retrieval during future operations. In this way, random access operations such as fast forward, rewind, and jumping to a location in the compressed media content instance can be attained.

In another implementation, according to a plurality of tuners, a respective number of analog video decoders 316, and a respective number of compression engines 317, the aforementioned compression of analog video and audio is performed and routed to hard disk 300 of the storage device 373 simultaneously for a respective number of analog media content instances. Alternatively, a single compression engine with sufficient processing capabilities can serve to compress more than one analog media content instance.

The DHCT 16 may also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 380 or keyboard that includes user-actuated buttons.

In one implementation, the DHCT 16 includes system memory 349, which includes FLASH memory 351 and dynamic random access memory (DRAM) 352, for storing various applications, modules and data for execution and use by the processor 344. Basic functionality of the DHCT 16 is provided by an operating system 353 that is primarily stored in FLASH memory 351. Among other elements, the operating system 353 includes at least one resource manager 367 that provides an interface to resources of the DHCT 16 such as, for example, computing resources. Also included within operating system 353 is one or more device drivers that provides operating instructions to an internal or external storage device, such as storage device 373, and peripheral devices not shown. For example, device driver 311 provides operating instructions to the storage device controller 379 of the storage device 373 to effect, among other functions, read and/or write operations to the hard disk of the storage device 373.

One or more programmed software applications, herein referred to as applications, or application clients, are executed by utilizing the computing resources in the DHCT 16. The applications may be resident in FLASH memory 351 or downloaded into DRAM 352. Applications stored in FLASH memory 351 or DRAM 352 are executed by processor 344 (e.g., a central processing unit or digital signal processor) under the auspices of the operating system 353. Data required as input by an application is stored in DRAM 352 or FLASH memory 351 and read by processor 344 as need be during the course of the application's execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by processor 344 during the course of the application's execution. DRAM 352 also includes application memory 370 that various applications may use for storing and/or retrieving data.

An application referred to as navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu.

The FLASH memory 351 also contains a platform library 356. The platform library 356 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3 are a window manager 359 and a service application manager (SAM) client 357.

The window manager 359 provides a mechanism for implementing the sharing of the screen regions and user input. The window manager 359 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 16 should receive data corresponding to the input key and in which order. As an application is executed, it registers a request to receive certain user input keys or commands. When the user presses a key corresponding to one of the commands on the remote control device 380, the command is received by the receiver 346 and relayed to the processor 344. The processor 344 dispatches the event to the operating system 353 where it is forwarded to the window manager 359 which ultimately accesses the user input registry 350 and routes data corresponding to the incoming command to the appropriate application.

The SAM client 357 is a client component of a client-server pair of components, with the server component (not shown) being located on the headend 11, preferably in the control system 232 (FIG. 2). A SAM database 360 (i.e. structured data such as a database or data structure) in DRAM 352 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 362), pay-per-view events (available through a PPV application 364), digital music (not shown), media-on-demand (available through an MOD application 363), and an interactive program guide (IPG) 397. In general, the identification of a service includes the identification of an executable application that provides the service along with a set of application-dependent parameters that indicate to the application the service to be provided. As a non-limiting example, a service of presenting a television program (i.e. media content instance) could be executed by WatchTV application 362 with a set of parameters specifying the HBO to view HBO or with a separate set of parameters to view CNN. Each association of the application component (tune video) and one parameter component (HBO or CNN) represents a particular service that has a unique service I.D. The SAM client 357 also interfaces with the resource manager 367, as discussed below, to control resources of the DHCT 16.

Application clients can also be downloaded into DRAM 352 at the request of the SAM client 357, typically in response to a request by the user or in response to a message from the headend 11. In this example, DRAM 352 includes a media-on-demand application (MOD) 363, an e-mail application 365, PVR application 377, and a web browser application 366. It should be clear to one with ordinary skill in the art that these applications are not limiting and merely serve as examples for this present embodiment of the disclosure. Furthermore, one or more DRAM based applications may be resident, as an alternative embodiment, in FLASH memory 351. These applications, and others provided by the subscriber television system operator, are top-level software entities on the network for providing services to the user.

In one implementation, applications executing on the DHCT 16 work with the navigator 355 by abiding by several guidelines. First, an application utilizes the SAM client 357 for the provision, activation, and suspension of services. Second, an application shares DHCT 16 resources with other applications and abides by the resource management policies of the SAM client 357, the operating system 353, and the DHCT 16. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application client, or application, is designed to not have access to certain user input keys reserved by the navigator (i.e., power, channel+/−, volume+/−, etc.).

The MOD client application 363 provides the user with lists of available media content titles for each media content instance to choose from and with media content instances requested by the user. The MOD client application 363 provides media content instances to the user by engaging, preferably, in a direct two-way IP (Internet Protocol) connection with VOD content servers (not shown) that would be located, in one embodiment, in the headend 11 (FIG. 2).

An executable program or algorithm corresponding to an operating system (OS) component, or to a client platform component, or to an application client, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application client, or to respective parts thereof, can reside in FLASH memory 351, or in a local storage device (such as storage device 373) connected to DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

The DHCT 16 includes at least one storage device 373 to provide storage for downloaded media content. PVR application 377 (described in greater detail below), in cooperation with the operating system 353 and the device driver 311, effects, among other functions, read and/or write operations to the storage device 373. Herein, references to write and/or read operations to the storage device 373 will be understood to mean operations to the medium or media of the storage device 373 unless indicated otherwise. The device driver 311 is a software module preferably resident in the operating system 353. The device driver 311, under management of the operating system 353, communicates with the storage device controller 379 to provide the operating instructions for the storage device 373. As conventional device drivers and device controllers are well known to those of ordinary skill in the art, further discussion of the detailed working of each will not be described further here. Storage device 373 is preferably internal to DHCT 16, coupled to a common bus through a communication interface 375, preferably an integrated drive electronics (IDE) or small computer system interface (SCSI), although IEEE-1394 or USB, among others, can be used. Alternatively, the storage device 373 can be externally connected to (and thus removable from) the DHCT 16 via a communication port 374 implemented as IEEE-1394 or USB or as a data interface port such as a SCSI or an IDE interface. In one implementation, under the auspices of the real-time operating system 353 executed by processor 344, and in coordination with the PVR application client 377, transmitted media content (herein understood to also refer to other types of data in addition to, or instead of, media content instances) are received in DHCT 16 via communications interface 342 and stored in a temporary cache (not shown) in memory 349. The temporary cache is implemented and managed to enable media content transfers from the temporary cache to storage device 373, or, in concert with the insertion of a newly arriving media content into the temporary cache. In one implementation, the fast access time and high data transfer rate characteristics of the storage device 373 enable media content to be read from the temporary cache in memory 349 and written to storage device 373 in a sufficiently fast manner. Orchestration of multiple simultaneous data transfer operations is effected so that while media content is being transferred from the cache in memory 349 to storage device 373, new media content is received and stored in the temporary cache of memory 349.

Processor 344 in communication generally with device driver 311 and storage device controller 379 and demultiplexing system 315 effect retrieval of compressed bitstreams, compressed audio streams, and data streams corresponding to one or more media content instances from storage device 373. Retrieved streams are deposited in an output cache in storage device 373 and transferred to memory 352, and then processed for playback according to mechanisms that would be understood by those having ordinary skill in the art. In some embodiments, the media content instances are retrieved and routed from the hard disk 300 to the digital video decoder 323 and digital audio decoder 325 simultaneously, and then further processed for eventual presentation on a display device or other device.

Storage device 373 can be an optical storage device or a magnetic storage device, among others, and is preferably a hard disk drive. Storage device 373 comprises storage for media content that can be written to for storage and later read from for retrieval for presentation. The storage device 373 preferably includes at least one hard disk 300 and a controller 379, which receives operating instructions from the device driver 311 and implements those instructions to cause read and/or write operations to the hard disk 300. The operating system 353, in cooperation with the device driver 311, communicates with the storage device controller 379 to format the hard disk 300, causing the hard disk to be divided radially into sectors 301 and concentric circles called tracks 302.

The PVR application 377 provides for media content recording functionality by enabling the temporary writing to, and if requested, more permanent recording to the storage device 373. Through mechanisms explained below, media content received into the TSB 378 will have a temporary recording designation. That is, media content stored in clusters of the TSB 378 will have a temporary residence. This receiving of media content into the TSB 378 for temporary residence will also be referred to as buffering. The media content stored in the TSB 378 will either be deleted (i.e. its associated management file record will be deleted and the clusters storing the media content will be configured as writeable for eventual write operations that overwrite the media content within those clusters) or retained (through election by the user) as a permanent recording. A permanent recording will be understood to mean media content that is stored for an extended period of time as decided by the user. Permanent recordings are stored in non-buffer clusters (i.e. not in clusters of the TSB 378) that are not used for the TSB 378 in instances when the user elects in advance to make a scheduled recording of a media content instance that has not yet been tuned to at the DHCT 16. A permanent recording can also be achieved by selecting a media content instance stored in the TSB 378 and designating the media content instance as permanent. As will be described below, this designation can occur, in one implementation, by selecting the desired content via a user interface screen. The PVR application 377 responds by "flagging" the associated management file as permanent. This designation for the desired media content instance is relayed to the device driver 311 and/or operating system 353, which effects the removal of the associated clusters from the TSB 378. Thus, permanent recordings will preferably be more permanent than media content in the TSB 378, and permanent recordings can eventually be deleted from the disk space, typically at the explicit request of a user, as one example. This deletion occurs, in one implementation, by configuring the associated non-buffer clusters as writeable, and thus eventually available for the TSB 378 or scheduled recordings.

Media content may be transmitted or downloaded from a remote location, such as, for example, a remote server located in the head end 11, or from a home communication network, or from other consumer electronic devices. In accordance with the preferred embodiment, the PVR application 377 manages buffer space, or a time shift buffer (TSB) 378, of downloaded media content instances, or programs (content), and/or data, at the application level for each tuner. Hence, each tuner in tuner system 345 has a respective TSB 378. Note that buffering is understood to mean temporarily receiving media content, resulting either from reception of a broadcast digital channel or a digital compressed version of a broadcast analog channel, and/or data into the buffer space, or TSB 378, of the storage device 373. In one embodiment, buffering for a digital compressed video program, or media content instance, results from a sourced video program instance and its associated audio signal that originated as an analog video signal received in DHCT 16 as a broadcast TV program instance received via network communication interface 342 (FIG. 3). Such analog video signals are compressed into digital form by the encoder 317 (FIG. 3), or other digitizing hardware or software, in DHCT 16 as explained above.

Figure 4:
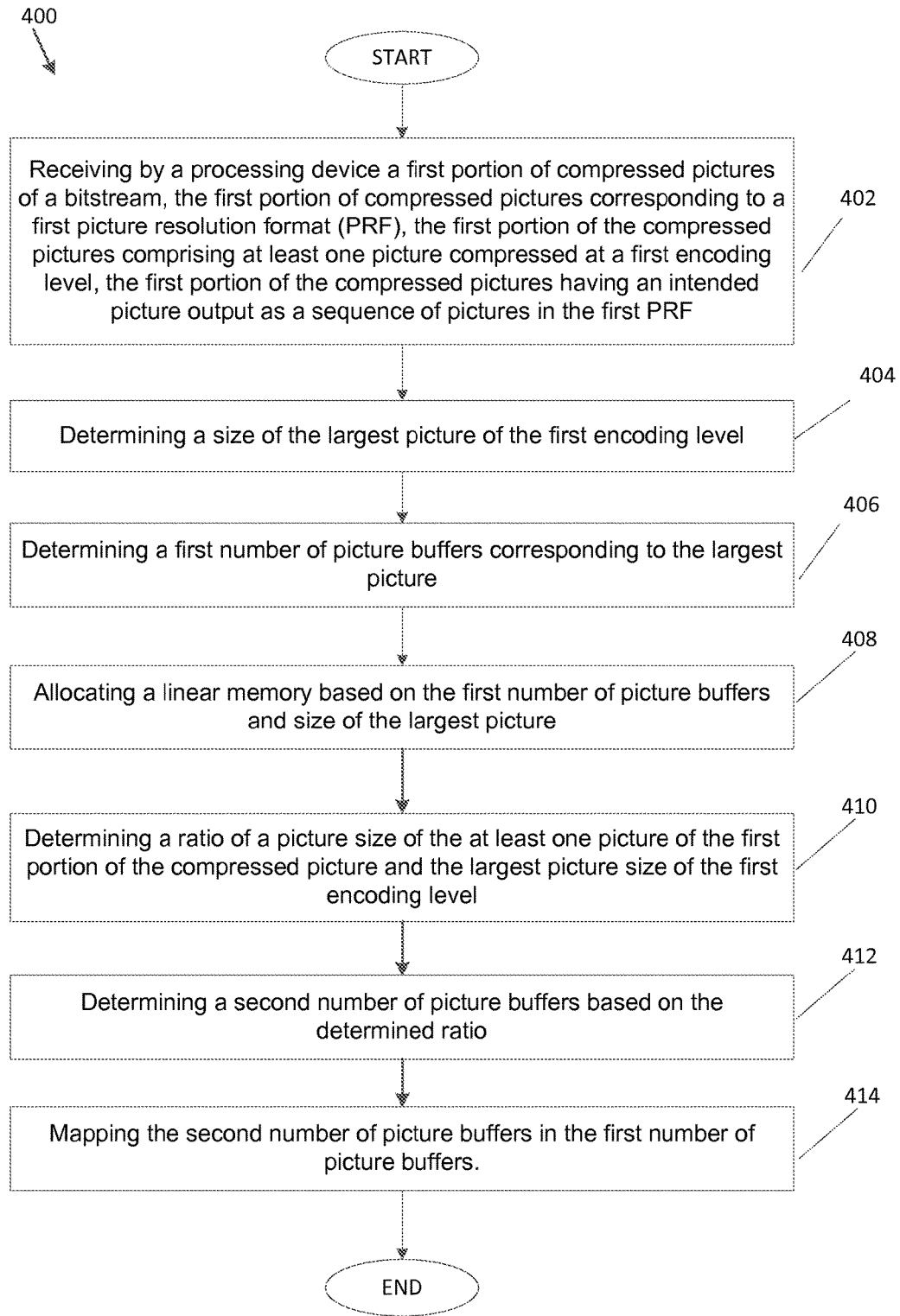
FIG. 4 is a flow diagram that illustrates one example VP method embodiment to process a bitstream.

Having described various embodiments of VP system, it should be appreciated that one VP method embodiment 400, illustrated in FIG. 4, can be broadly described as receiving by a processing device a first portion of compressed pictures of a bitstream, the first portion of compressed pictures corresponding to a first picture resolution format (PRF), the first portion of the compressed pictures comprising at least one picture compressed at a first encoding level, the first portion of the compressed pictures having an intended picture output as a sequence of pictures in the first PRF (402); determining a size of the largest picture of the first encoding level (404); determining a first number of picture buffers corresponding to the largest picture (406); allocating a linear memory based on the first number of picture buffers and size of the largest picture (408); determining a ratio of a picture size of the at least one picture of the first portion of the compressed picture and the largest picture size of the first encoding level (410); determining a second number of picture buffers based on the determined ratio (412); and mapping the second number of picture buffers in the first number of picture buffers (414).

Figure 5:
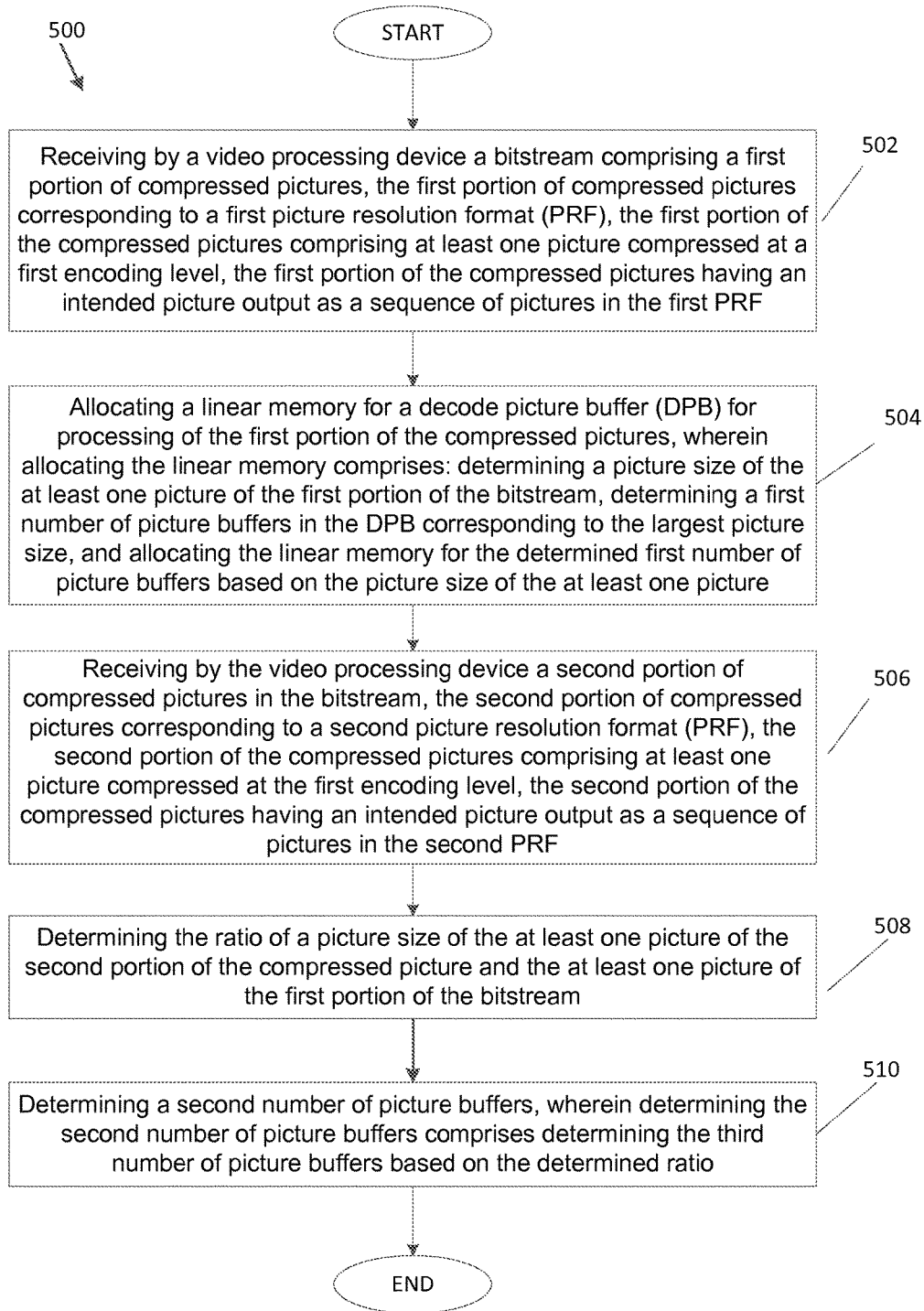
FIG. 5 is another flow diagram that illustrates one example VP method embodiment to process a bitstream.

In another VP method embodiment 500, illustrated in FIG. 5, can be broadly described as receiving by a video processing device a bitstream comprising a first portion of compressed pictures, the first portion of compressed pictures corresponding to a first picture resolution format (PRF), the first portion of the compressed pictures comprising at least one picture compressed at a first encoding level, the first portion of the compressed pictures having an intended picture output as a sequence of pictures in the first PRF (502); allocating a linear memory for a decode picture buffer (DPB) for processing of the first portion of the compressed pictures, wherein allocating the linear memory comprises: determining a picture size of the at least one picture of the first portion of the bitstream, determining a first number of picture buffers in the DPB corresponding to the largest picture size, and allocating the linear memory for the determined first number of picture buffers based on the picture size of the at least one picture (504); receiving by the video processing device a second portion of compressed pictures in the bitstream, the second portion of compressed pictures corresponding to a second picture resolution format (PRF), the second portion of the compressed pictures comprising at least one picture compressed at the first encoding level, the second portion of the compressed pictures having an intended picture output as a sequence of pictures in the second PRF (506); determining the ratio of a picture size of the at least one picture of the second portion of the compressed picture and the at least one picture of the first portion of the bitstream (508); and determining a second number of picture buffers, wherein determining the second number of picture buffers comprises determining the third number of picture buffers based on the determined ratio (510).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 4 and 5 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the method described in FIGS. 4 and 5, either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the VP systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method of processing a bitstream, the method comprising:

receiving, by a processing device, a first portion of compressed pictures of a bitstream, the first portion of compressed pictures corresponding to a first picture resolution format (PRF), the first portion of the compressed pictures comprising at least one picture compressed at a first encoding level, the first portion of the compressed pictures having an intended picture output as a sequence of pictures in the first PRF;

determining a size of a largest picture of the first encoding level;

determining a first number of picture buffers corresponding to the largest picture;

allocating a linear memory based on the first number of picture buffers and the size of the largest picture;

determining a ratio of a picture size of the at least one picture of the first portion of the compressed picture and the largest picture size of the first encoding level;

determining a second number of picture buffers based on the determined ratio, wherein determining the second number of picture buffers comprises sizing each frame buffer of the linear memory in units corresponding to a maximum coding block size of the largest picture size of the first encoding level; and mapping the second number of picture buffers in the first number of picture buffers, wherein mapping the second number of picture buffers comprises mapping the second number of picture buffers in a consecutively marked integral portion of the first number of picture buffers, the consecutively marked integral portion of the first number of picture buffers being determined based on the determined ratio, wherein mapping the second number of picture buffers in the first number of picture buffers comprises at least one of the following:

mapping two of the second number of picture buffers into each buffer of the first number of picture buffers for a first ratio and determining a first number of recorder pictures for the bitstream, wherein the first number of recorder pictures indicates a number of pictures yet to be displayed that are stored in the first number of the picture buffers, wherein determining the first number of recorder pictures for the bitstream comprises determining the first number of the recorder pictures as two less than the first number of picture buffers, and mapping three of the second number of picture buffers into two consecutive buffers of the first number of picture buffer for a second ratio, wherein the second ratio is greater than the first ratio and determining a second number of recorder pictures for the bitstream, wherein the second number of recorder pictures indicates the number of pictures yet to be displayed that are stored in the first number of the picture buffers, wherein determining the second number of recorder pictures for the bitstream comprises determining the second number of the recorder pictures as one less than the first number of picture buffers.

2. The method of claim 1, wherein allocating the linear memory comprises allocating the linear memory wherein the linear memory is demarcated at boundaries corresponding to a start of each picture buffer in a decodable picture buffer (DPB).

3. The method of claim 1, wherein allocating the linear memory comprises allocating the linear memory wherein each of the first number of picture buffers and the second number buffers are accessible in the linear memory by pointers.

4. The method of claim 1, further comprising:

decoding the first portion of the compressed pictures by the video processing device; and storing by the video processing device the decoded first portion of the compressed pictures in the second number of picture buffers, wherein each picture is stored in one location of the second number of picture buffers, and corresponds to a picture used as a reference picture.

5. The method of claim 4, wherein storing the decoded first portion of the compressed picture in the second number of picture buffers comprises storing the decoded first portion of the compressed picture in the second number of picture buffers wherein each picture stored in the second number of picture buffers corresponds to a picture yet to be displayed.

6. The method of claim 1, further comprising:
receiving by the video processing device a second portion of compressed pictures in the bitstream, the second portion of compressed pictures corresponding to a second picture resolution format (PRF), the second portion of the compressed pictures comprising at least one picture compressed at the first encoding level, the first portion of the compressed pictures having an intended picture output as a sequence of pictures in the second PRF;
determining the ratio of a picture size of the at least one picture of the second portion of the compressed picture and the largest picture size of the first encoding level; and
determining a third number of picture buffers, wherein determining the third number of picture buffers comprises determining the third number of picture buffers based on the determined ratio.

7. The method of claim 6, further comprising receiving auxiliary information with the second portion of the compressed picture, the auxiliary information indicating a change of PRF in the bitstream.

8. The method of claim 1, wherein determining the second number of picture buffers further comprises determining the second number for the value of frame buffer of the linear memory in units corresponding to a maximum coding block size of the largest picture size of the first encoding level.

9. A method of processing a bitstream, the method comprising:
receiving by a video processing device a bitstream comprising a first portion of compressed pictures, the first portion of compressed pictures corresponding to a first picture resolution format (PRF), the first portion of the compressed pictures compressed at a first encoding level, the first portion of the compressed pictures having an intended picture output as a sequence of pictures in the first PRF;
allocating a linear memory for a decode picture buffer (DPB) for processing of the first portion of the compressed pictures, wherein allocating the linear memory comprises:
determining a first largest picture size of the first portion of the bitstream,
determining a first number of picture buffers in the DPB corresponding to the first largest picture size, and
allocating the linear memory for the determined first number of picture buffers based on the first largest picture size;
receiving by the video processing device a second portion of compressed pictures in the bitstream, the second portion of compressed pictures corresponding to a second picture resolution format (PRF), the second portion of the compressed pictures compressed at a second encoding level, the second portion of the compressed pictures having an intended picture output as a sequence of pictures in the second PRF;
determining a second largest picture size of the second portion of the bitstream;
determining a ratio of the second largest picture size and the first largest picture size;
determining a second number of picture buffers for processing of the second portion of the compressed pictures, wherein determining the second number of picture buffers comprises determining the second number of picture buffers based on the determined ratio; and
mapping the second number of picture buffers in the first number of picture buffers, wherein mapping the second number of picture buffers comprises mapping the second number of picture buffers in a consecutively marked integral portion of the first number of picture buffers, the consecutively marked integral portion of the first number of picture buffers being determined based on the determined ratio, wherein mapping the second number of picture buffers in the first number of picture buffers comprises at least one of the following:
mapping two of the second number of picture buffers into each buffer of the first number of picture buffers for a first ratio and determining a first number of recorder pictures for the bitstream, wherein the first number of recorder pictures indicates a number of pictures yet to be displayed that are stored in the first number of the picture buffers, wherein determining the first number of recorder pictures for the bitstream comprises determining the first number of the recorder pictures as two less than the first number of picture buffers, and
mapping three of the second number of picture buffers into two consecutive buffers of the first number of picture buffer for a second ratio, wherein the second ratio is greater than the first ratio and determining a second number of recorder pictures for the bitstream, wherein the second number of recorder pictures indicates the number of pictures yet to be displayed that are stored in the first number of the picture buffers, wherein determining the second number of recorder pictures for the bitstream comprises determining the second number of the recorder pictures as one less than the first number of picture buffers.

10. The method of claim 9, wherein receiving the first portion of compressed pictures corresponding to the first PRF compressed at the first encoding level comprises receiving the first portion of the compressed pictures corresponding to the first PRF wherein the first PRF is maximum PRF corresponding to the first encoding level.

11. The method of claim 9, wherein determining the second number of picture buffers based on the determined ratio comprises determining the second number of picture buffers based on the determined ratio wherein the determined ratio is in a range of 0 to 0.5 and the second number of picture buffers is twice as the first number of picture buffers.

12. The method of claim 9, wherein determining the second number of picture buffers based on the determined ratio comprises determining the second number of picture buffers based on the determined ratio wherein the determined ratio is in a range of 0.5 and 0.667, and the second number of picture buffers is 1.667 times the first number of picture buffers.

13. The method of claim 9, wherein determining the second number of picture buffers based on the determined ratio comprises determining the second number of picture buffers based on the determined ratio wherein the determined ratio is in a range of 0.667 and 0.75, and the second number of picture buffers is 1.33 times the first number of picture buffers.

14. The method of claim 9, wherein determining the second number of picture buffers based on the determined ratio comprises determining the second number of picture buffers based on the determined ratio wherein the determined ratio is in a range of 0.75 and 1.0, and the second number of picture buffers is same as the first number of picture buffers.

15. The method of claim 14, wherein reusing the linear memory for processing the second portion of the compressed pictures comprises reusing the linear memory for processing the second portion of the compressed pictures without deallocating and reallocating the linear memory.

16. The method of claim 9, further comprising:
determining an amount of the linear memory for the first number of the picture buffers;
allocation the determined amount of linear memory for the first number of the picture buffers.

17. The method of claim 16, further comprising reusing the linear memory allocated for the processing of the first portion of the compressed pictures, for processing the second portion of the compressed pictures.

18. A system comprising:
a memory, and
a processor coupled to the memory, the processor configured to:
receive a first portion of compressed pictures of a bitstream, the first portion of compressed pictures corresponding to a first picture resolution format (PRF), the first portion of the compressed pictures comprising at least one picture compressed at a first encoding level, the first portion of the compressed pictures having an intended picture output as a sequence of pictures in the first PRF;
determine a size of a largest picture of the first encoding level;
determine a first number of picture buffers corresponding to the largest picture;
allocate a linear memory based on the first number of picture buffers and the size of the largest picture;
determine a ratio of a picture size of the at least one picture of the first portion of the compressed picture and the largest picture size of the first encoding level;
determine a second number of picture buffers based on the determined ratio, wherein determining the second number of picture buffers comprises sizing each frame buffer of the linear memory in units corresponding to a maximum coding block size of the largest picture size of the first encoding level; and
map the second number of picture buffers in the first number of picture buffers, wherein mapping the second number of picture buffers comprises mapping the second number of picture buffers in a consecutively marked integral portion of the first number of picture buffers, the consecutively marked integral portion of the first number of picture buffers being determined based on the determined ratio, wherein the processor being configured to map the second number of picture buffers in the first number of picture buffers comprises the processor being configured to at least one of the following:
map two of the second number of picture buffers into each buffer of the first number of picture buffers for a first ratio determining a first number of recorder pictures for the bitstream, wherein the first number of recorder pictures indicates a number of pictures yet to be displayed that are stored in the first number of the picture buffers, wherein determining the first number of recorder pictures for the bitstream comprises determining the first number of the recorder pictures as two less than the first number of picture buffers, and
map three of the second number of picture buffers into two consecutive buffers of the first number of picture buffer for a second ratio, wherein the second ratio is greater than the first ratio and determining a second number of recorder pictures for the bitstream, wherein the second number of recorder pictures indicates the number of pictures yet to be displayed that are stored in the first number of the picture buffers, wherein the second number of the recorder pictures is determined as two less than the first number of picture buffers.

19. The system of claim 18, wherein the linear memory is demarcated at boundaries corresponding to a start of each picture buffer in a decodable picture buffer (DPB).

20. The system of claim 18, wherein each of the first number of picture buffers and the second number buffers are accessible in the linear memory by pointers.

* * * * *